United States Patent [19]

Ichida

[11] 3,766,528

[45] Oct. 16, 1973

[54] PATTERN GENERATING DEVICE

[75] Inventor: Takeshige Ichida, Hirakata, Japan

[73] Assignee: Matsushita Electric Industrial Co. Ltd., Osaka, Japan

[22] Filed: Feb. 28, 1972

[21] Appl. No.: 229,713

Related U.S. Application Data

[63] Continuation-in-part of Ser. No. 64,745, Aug. 18, 1970, abandoned.

[52] U.S. Cl. .......................... 340/172.5, 340/324 A

[51] Int. Cl. ......... G06f 3/02, G06f 3/06, G06f 3/14

[58] Field of Search ..................... 340/172.5, 324 A, 340/324 AD; 178/18

[56] References Cited

UNITED STATES PATENTS

| | | | |
|---|---|---|---|
| 3,166,636 | 1/1965 | Rutland et al. | 178/24 |
| 3,364,382 | 1/1968 | Harrison | 315/18 |
| 3,364,473 | 1/1968 | Reitz et al. | 340/172.5 |
| 3,529,298 | 9/1970 | Lourie | 340/172.5 |
| 3,531,775 | 9/1970 | Yasuoish | 340/172.5 |
| 3,581,290 | 5/1971 | Sugarman | 340/172.5 |
| 3,582,936 | 6/1971 | Kite | 340/324 |
| 3,593,310 | 7/1971 | Kievit | 340/172.5 |

*Primary Examiner*—Paul J. Henon
*Assistant Examiner*—James D. Thomas
*Attorney*—Richard K. Stevens et al.

[57] ABSTRACT

A pattern generating device has a function of storing pattern information in a memory consisting of a matrix of a number of storage elements by means of a set of switches disposed in correspondence to the storage elements respectively, then reading the pattern information formed on the matrix of the storage elements by scanning the columns and rows thereof, forming a visual pattern on a CRT display device synchronized with the scanning operation for monitoring the pattern information made on the memory, correcting the errors in the pattern information formed on the memory by operating switches corresponding to the storage elements making the errors, and then recording the pattern information by means of a recording device. In accordance with this pattern generating device, a pattern information consisting of a great number of spots can be made in a short time and an animation in a mosaic pattern can be carried out with high efficiency.

5 Claims, 25 Drawing Figures

PATTERN GENERATING DEVICE

CROSS-REFERENCE TO RELATED APPLICATION

This is a continuation-in-part application of Ser. No. 64,745 filed on Aug. 18, 1970, now abandoned.

BACKGROUND OF THE INVENTION

1. FIELD OF THE INVENTION

The present invention relates to a pattern generating device and in particular to a signal generating device for forming a pattern consisting of pattern elements arranged in a mosaic arrangement.

2. DESCRIPTION OF THE PRIOR ART

A device for forming a pattern by scanning a great number of light emitting elements arranged in a mosaic arrangement at high speed has been developed and put into practice. This type of device has a feature that a variety of patterns can be freely formed in comparison with the conventional display device.

As the function of the display device has been upgraded, a signal source of high efficiency has become required to be developed. That is, means for efficiently making signals for on-off controlling the respective light emitting elements independently is needed for efficiently carrying out an animation performance. In order to fulfil the above described requirement, such a device has been developed as that which uses a keyboard having a number of switches arranged in matrix arrangement in correspondence to the respective light emitting elements and selectively turns on or off the switches and after completion of a pattern records the switching signals on a magnetic tape with a magnetic recording and reproducing device by making a synchronizing control signal and on-off control signal of the light emitting element.

The above-described conventional device suffers from the defect that when we find some mistakes in recorded tapes and want to correct it, it is cumbersome to re-form the control signal after the control signal for one story has been made and recorded on a magnetic tape. Since, in general, in animation a pattern in the subsequent frame is not so much different from the pattern in the previous frame, it is much loss from the viewpoint of efficiency to remake the control signal and re-form the modified pattern in animation. It is therefore a heavy burden to the operator of the above-described device to remake the modified pattern.

SUMMARY OF THE INVENTION

In light of the foregoing observations and descriptions, it is a primary object of the present invention to provide a pattern generating device in which the control signal for making animation can be efficiently made and the burden on the operator making the signal is much reduced.

Another object of the present invention is to provide a pattern generating device for successively making pattern frames in which the pattern information is once memorized in a memory by means of a set of switches and the memorized pattern information is converted into a visual pattern on a monitoring display device for modification or correction, and after modified or corrected the pattern information is recorded with a recording device.

Still another object of the present invention is to provide a pattern generating device in which a pattern information once recorded is memorized by a memory and the memorized information is monitored through a display device so that the errors in the pattern information can be corrected.

A further object of the present invention is to provide a pattern generating device in which pattern information for forming a running message can be made by repeating operations to shift in one direction a pattern information for one frame once recorded and make the memory memorize this shifted pattern and after writing a new pattern information in the blank made by the shift record the written new pattern information adjacent to the memorized pattern information.

A still further object of the present invention is to provide a pattern generating device in which pattern information can be written on a memory by the use of a light pen without using a number of switches to simplify the making of the pattern signal.

In order to better understand the operation and construction of the device of the invention, a brief summary of the invention will be helpful. The device in accordance with the present invention includes a set of switches arranged in a matrix arrangement disposed respectively in correspondence to the light emitting elements of the pattern display device. The output of the pattern information generated by operating the set of switches is first recorded in a memory. The memorized pattern information for one frame is monitored through a CRT display device so that the pattern information may be corrected or modified by operating the foregoing set of switches. The corrected or modified pattern information for successive frames is read out and recorded on a magnetic tape employed as a recording medium. In the case of animation, since the pattern has to be modified only slightly for the subsequent frame, only a part of the set of switches is operated to modify a part of the memorized pattern. Then the modified pattern information on the memory is recorded on a magnetic tape. Thus, the control signals for the subsequent frames are made. In the case of a stationary pattern, the memorized information in the memory is repeatedly read and recorded. By repeating to make the identical pattern signal for a definite time, the stational pattern is made. Thus, by continuously reproducing the successive pattern signals recorded on a magnetic tape with a magnetic recording and reproducing device, the control signals for the display device are obtained and it becomes possible to display an animation or stationary image pattern.

Furthermore, in the present invention, a monitoring CRT display device and a light pen are substituted for the set of switches for modifying the memorized information on the memory by the use of an added controlling means, thereby making a pattern signal in a short time.

DESCRIPTION OF PREFERRED EMBODIMENTS

Figure 1:
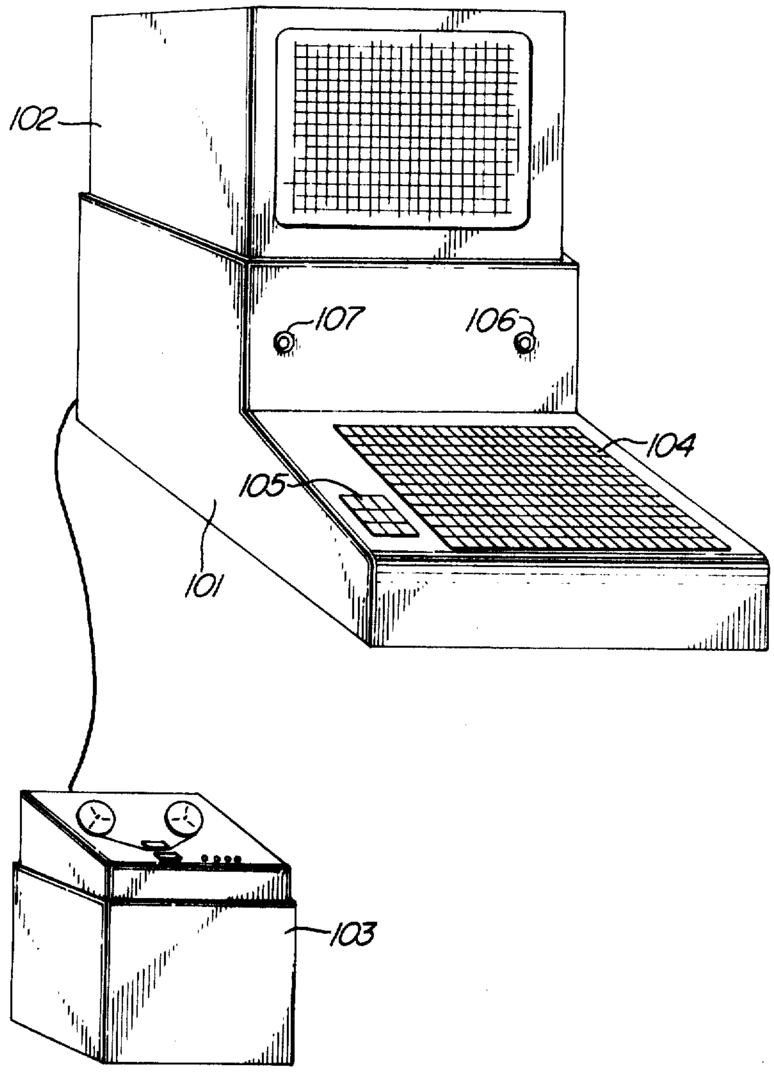
FIG. 1 is a perspective view of an embodiment of the device in accordance with the present invention.

Referring now to FIG. 1, the reference numeral 101 indicates a pattern forming device, on which a monitoring device 102 is disposed and with which a magnetic recording and reproducing device 103 is connected. The pattern forming device 101 includes a keyboard 104 consisting of a number of switches arranged in a matrix arrangement, a color selecting switch assembly 105 for selecting the color of the pattern formed on the monitoring device 102, a first operating switch 106 for reading out the memorized signal put in by the keyboard 104 and making the magnetic recording and reproducing device 103 record the read out signal, and a second operating switch 107 for erasing all the signals memorized by the memory.

In operation, a pattern is made memorized in a memory by selectively operating the switches of the keyboard 104. At the same time, the memory is scanned for reading out the memorized information and the read out information is converted into a visual pattern on the monitoring device 102. In this reading out monitoring device 102, the elements constituting the pattern are made into square shape or the like so as to form a mosaic pattern. The elements constituting the mosaic pattern will be hereinafter referred to as "illuminating mosaic elements."

When there is an error in the formed pattern, the switch on the keyboard 104 corresponding to the illuminating mosaic element disposed at the position of the error is operated to correct the error. If the color selection of the illuminating mosaic element is incorrect at this time, the color selecting switch assembly 105 is operated to get the right color. After the correction is performed, the first operating switch 106 is operated to start read-out scanning for recording and the magnetic recording and reproducing device 103 is started to record the read out signal on a magnetic tape synchronously with the scanning. When the scanning is finished, a signal for one frame is recorded by the magnetic recording and reproducing device 103. For the subsequent frame, similarly the illuminating mosaic elements to be corrected are selectively corrected by means of the switch on the keyboard 104. After the correction, the signal for the subsequent frame is recorded by the magnetic recording and reproducing device 103. By repeating the above-described operations, the signals for performing animation are recorded on the recording tape by the recording device.

In the case that the pattern is to be wholly changed, the second operating switch 107 is operated to drive the eraser to reset all the elements of the memory.

Figure 2:
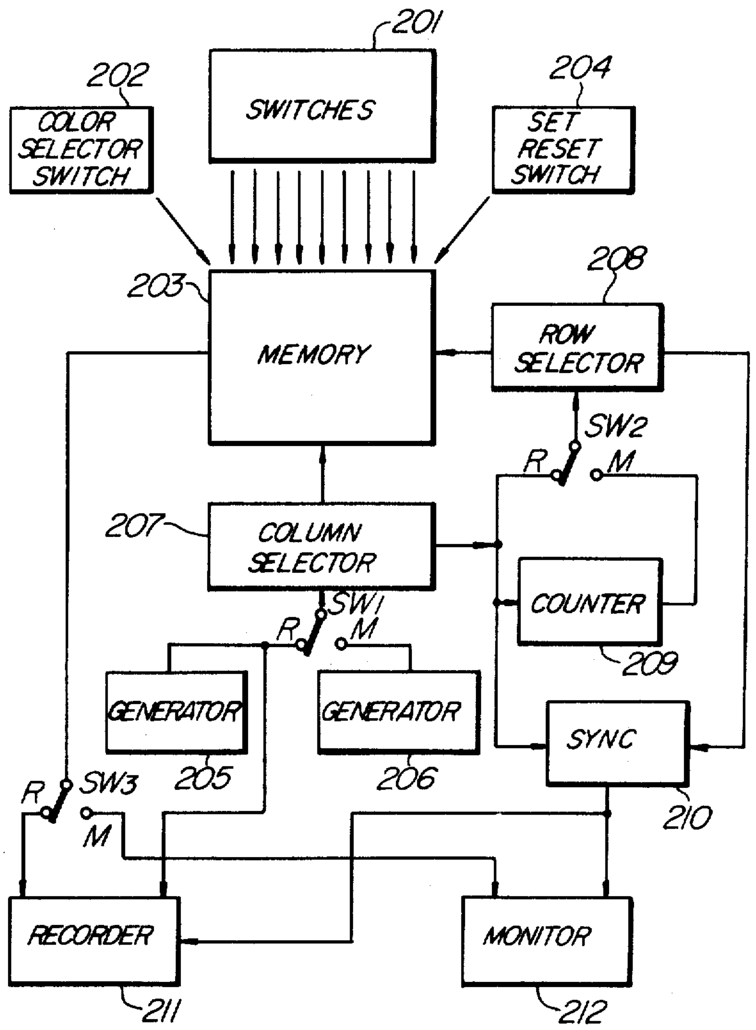
FIG. 2 is a diagramatic representation showing the basic construction of the device.

FIG. 2 shows an electrical construction of the device as described hereinabove. In the drawing, the reference numeral 201 indicates the switches constituting the keyboard 104 as shown in FIG. 1 and being arranged in correspondence to the illuminating mosaic elements. By selectively operating the switches 201, the signal for forming the pattern is made. The reference numeral 202 indicates a color selector switch for selecting the color of the formed pattern. With the switches 201 is connected a memory 203 consisting of storage elements corresponding to the respective switches 201. The reference numeral 204 indicates a switch for selecting one of the operations between setting and resetting the memory 203. By the setting operation of the switch 204, all the storage elements of the memory 203 are set to memorize identical signal, e.g. 1 or 0. This is effective to make the memory memorize the color of the background of the pattern and the color is selected by operating the color selector switch 202. A clock pulse generator for generating the scanning signal for reading the pattern memorized in the memory 203 is shown at 205. The reference numeral 206 indicates a clock pulse generator for monitoring the pattern memorized in the memory 203. The reference numeral 207 indicates a column selector for selecting the memory column to which is supplied the output of either the clock pulse generator 205 or 206 selected by a change-over switch SW1. The reference numeral 208 indicates a row selector for selecting the memory row of the memory 203. 209 indicates a counter for counting the output pulse at the output terminal located at the end of the column selector 207. The row selector 208 is driven directly by the said output pulse of the column selector 207 selected with a changeover switch SW2 or by the output pulse of the counter 209.

The reason for employing the counter 209 will now be explained. If, in case of monitoring the memorized information in the memory by means of a CRT display device, the storage elements would simply be scanned sequentially, the memorized information will be represented on the CRT of the above display device with short bright lines. In order to make a pattern identical with the memorized pattern on the monitoring display device, the same column should be repeatedly scanned several times and the memorized information is needed to be represented with an assembly of a plurality of parallel bright lines. This repeated scanning is made possible by the use of the counter 209, and the assembly of the parallel bright lines constitutes the foregoing illuminating mosaic elements.

The reference numeral 210 indicates a composite synchronizing signal generator which compounds the output pulses from the column selector 207 and the row selector 208, supplies the composite synchronizing signal to the recorder 211 and the monitor 212, and synchronizes the reading out of the memory 203 with the recording of the recorder 211 or forming pattern of the monitor 212. A third change-over switch SW3 is interrelated with the first and second change-over switches SW1 and SW2 and operated for supplying the output of the memory 203 to one of the recorder 211 and the monitor 212. In the drawing, FIG. 2, the movable contacts of the change-over switches SW1, SW2 and SW3 are set on the R-terminal side when recording and set on the M-terminal side when monitoring.

As the memory 203, a magnetic core memory or a memory consisting of a number of flip-flop circuits arranged in a matrix is employed with non-destructive reading out. In order to make a color pattern signal, the pattern is decomposed into three colors, red, green and blue, and three kinds of memory of the identical construction for memorizing the three colors respectively are necessitated.

Now the operation of the above-described device shown in FIGS. 1 and 2 will be described in detail. First, the change-over switches SW1, SW2 and SW3 are put into the M-terminal side for monitoring, then the color of the pattern to be formed is selected by the color selector switch 202. Then the switches 201 are selectively operated to make the storage elements in the memory 203 at the corresponding position to the switches memorize the color of the illuminating mosaic elements. For instance, in the case that the color of the illuminating mosaic elements of the pattern at the position represented by the coordinate $(x, y)$ is yellow, the color selector switch 202 is operated to select the red and green pattern memorizing parts of the memory 203 and one switch of the switches 201 positioned at the coordinate $(x, y)$ is closed for a short time to make the red and green pattern memorizing part memorize 1. On the blue pattern memorizing part of the memory positioned at the position represented by the coordinate $(x, y)$ is written 0. For other illuminating mosaic elements, similarly the writing is conducted on the elements of the memory corresponding to the mosaic elements.

On the other hand, the column of the memory 203 is selected by the column selector 207 with the output of the clock pulse generator 206. The counter 209 counts the number of times of scanning of the column selector 207 and generates an output every time the predetermined number of times of scanning is completed to actuate the row selector 208 through the switch SW2. Accordingly, every time the same column of the memory 203 is scanned several times, the row is changed. Thus, the memorized information is read out from the memory 203 and the read out signal is transmitted to the monitor 212 through the change-over switch SW3. The monitor 212 is operated in synchronism with the reading out operation through the composite synchronizing signal generator 210 to form a visual pattern identical with the pattern memorized in the memory 203.

After a pattern for one frame has been memorized in the memory 203, the pattern memorized is monitored on the CRT of the monitoring device so as to be compared with the desired pattern to be rightly memorized and corrected or modified. After correction or modification, the change-over switches SW1, SW2 and SW3 are switched in the R-terminal side for recording. The column selector 207 is operated by the output pulse of the clock pulse generator 205 and the row selector 208 is shifted every time the column selector 207 once scans the memory. The recorder 211 is operated incrementally only while the pattern information of the memory is read out to record the pattern for one frame. For the next frame, the change-over switches SW1, SW2 and SW3 are again set on the monitoring side and the next pattern information is recorded after correcting or modifying the pattern by monitering. By repeating such operations as described above, an animation can be produced.

The reason for using the clock pulse generators 205 and 206 for monitoring and recording respectively and for selecting the pulse generators by a change-over switch SW1 is that the scanning speed of the monitor 212 is different from the recording speed of the recorder 211.

The monitor 212 is driven by four inputs of the red, green and blue pattern memorizing parts and the synchronizing signal. Its scanning system is almost similar to those of commonly used receivers.

Figure 9:
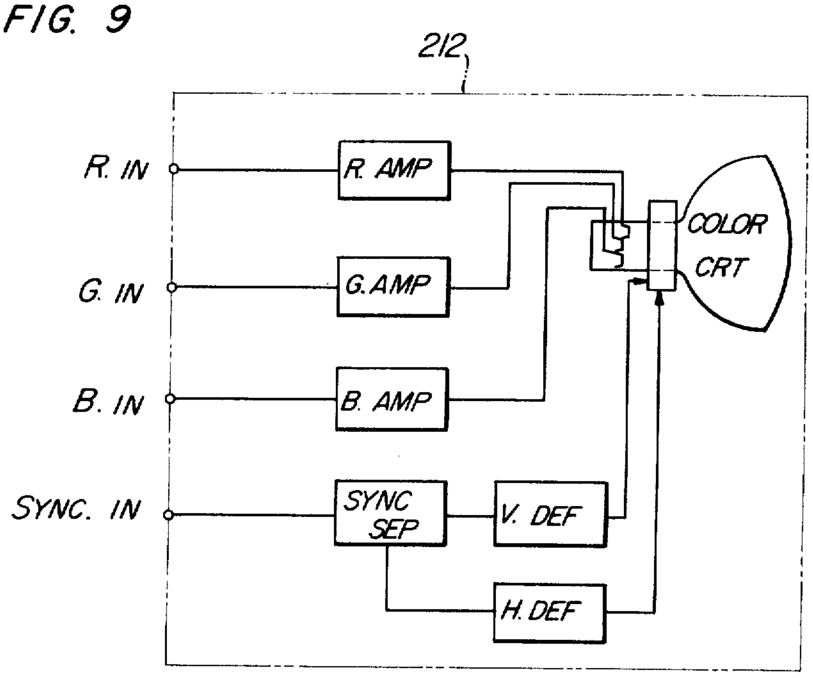
FIG. 9 is a block diagram showing the construction of the moniter circuit 212 in FIG. 3.

The block diagram of the monitor 212 is shown in FIG. 9 in detail.

Figure 10:
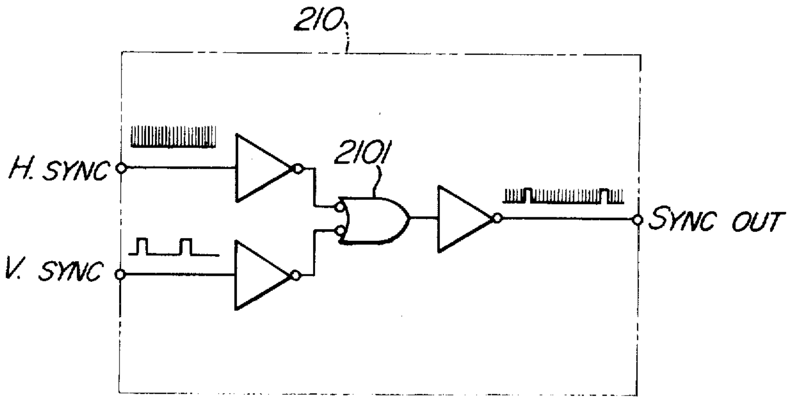
FIG. 10 is a detailed block diagram showing the synchronous circuit 210 in FIG. 3.

The block diagram of the composite synchronizing signal generator 210 in shown in FIG. 10 in detail. In FIG. 10 a horizontal synchronizing signal and a vertical synchronizing signal are combined by an orgate 2101 to obtain a series of synchronizing signals. The composite synchronizing signal generator 210 is almost same as commonly used synchronizing signal generators.

If the change-over switches Sw1, SW2 and SW3 are combined together and the combined switch is made to be controlled by the operation of a switch 106 as shown in FIG. 1, it is possible to interrelate the reading out of the memory 203 with the recording in the recorder.

Figure 3:
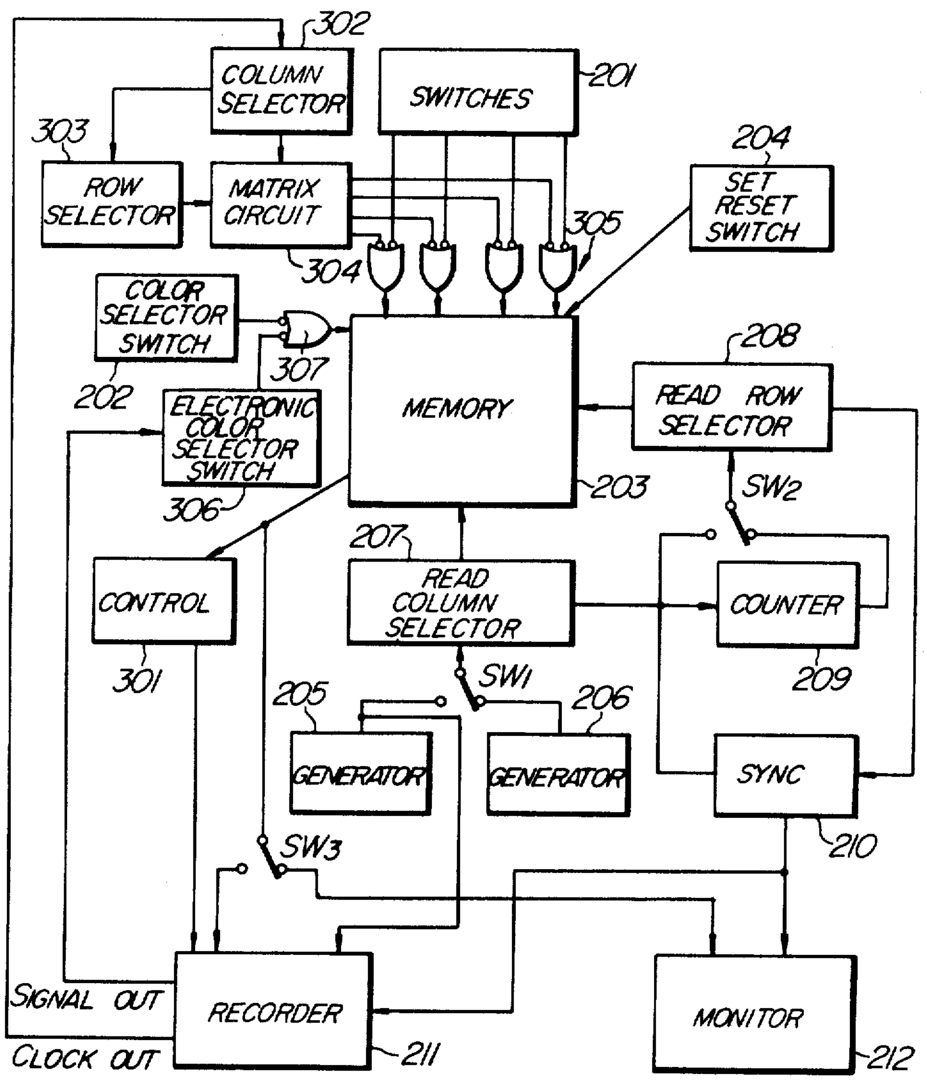
FIG. 3 is a block diagram showing a construction of an embodiment of the device of the invention.

FIG. 3 shows an electrical construction of the device of the invention further improved from the device shown in FIG. 2. This improved device has a function of correcting or modifying the pattern information once recorded in the magnetic tape by monitoring the information once recorded in the magnetic tape.

In FIG. 3, the elements having the like function as those in the device shown in FIG. 2 are represented by the same reference numerals. The method of generating and reading out the pattern is just the same that of the device shown in FIG. 2.

The elements added to the device shown in FIG. 3 are an electric circuit 301 for controlling the magnetic tape recorder 211, a column selector 302 and row selector 303 for indicating the position for writing, a matrix circuit 304 for indicating the position for writing on the memory 203 by means of the output of the selectors 302 and 303, an OR gate 305 operating with the output of the matrix circuit 304, an electronic color selector switch 306 operating in response to the color signal of the recorder 211, and another OR gate 307 generating output when the electronic color selector switch 306 or the color selector switch 202 generates output.

Figures 8A, 8B, 8C, 8D, 8E:
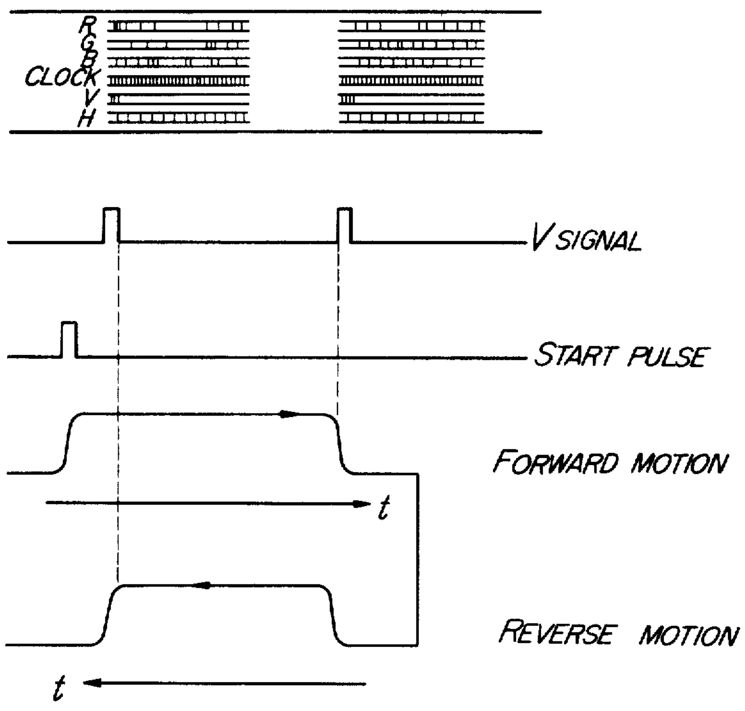
FIGS. 8a–e depict the operation of the control circuit 301 in FIG. 3.

The signal recorded on the magnetic tape is reproduced by the recorder 211 by means of a recorder controlling electric circuit 301, which is a circuit to start and stop the magnetic tape recorder 211 and to read out one picture by one picture incrementally, and which is explained in FIG. 8 in detail. In FIG. 8, FIG. 8*a* shows a magnetic tape on which a series of pictures are recorded. FIG. 8*b* shows the wave form of the vertical synchronizing signal recorded on the magnetic tape when the vertical synchronizing signal is read out. FIG. 8*c* shows the output of a start pulse of a start button pushed in case of reading out one picture. FIG. 8*d* shows the forward running motion of the magnetic tape. FIG. 8*e* shows the backward running motion of the magnetic tape. However, the direction of the motion is opposite to that of time axis.

Next, the operations of the recorder controlling electric circuit 301 will be explained hereinbelow.

A start pulse is generated by pushing a start button. The recorder controlling circuit 301 is operated by this start pulse signal to run recorder 211 in the forward direction. Consequently, a vertical synchronizing signal V, a horizontal synchronizing signal H, a clock signal and color signals R, G and B are read out from the forward running magnetic tape. For example, when the signals indicated in the left side of FIG. 8*a* are read out, they are memorized in a memory 203.

In this case, the first vertical synchronizing signal (left side of FIG. 8*b*) is detected in order to reproduce one frame thereafter. When the tape is run in its forward direction, the vertical synchronizing signal V of the next frame is reproduced (right side of FIG. 8*b*). The recorder controlling circuit 301 reverses the recorder 211 upon the sensing of the second vertical synchronizing signal pulse. When the first vertical synchronizing signal V is again reproduced, the reverse operation of the recorder 211 is stopped. This type of operation is old in the art and particularly well known in the area of language learning by using magnetic tape recording/reproducing instruction machines; in these devices control signals recorded on the tape permit replaying a desired segment of the tape over and over.

The clock pulse reproduced by the recorder 211 is transmitted to the column selector 302 and to the row selector 303 also. By the output of the selectors 302 and 303, the matrix circuit 304 sequentially indicates the writing positions of the memory 203. Since the signals on the magnetic tape are recorded parallel in synchronism with the indication of the writing position, the color signal reproduced is transmitted to the recording portion of the pattern of the red, green and blue color components of the memory 203 by the operation of the electronic color selector switch 306. When the storage element of the memory 203 has memorized one frame, the recorder 211 is stopped, and recorder 211 is rewound reversely during one frame and is then stopped.

Signals transmitted from the magnetic tape to the memory 203 correct any desired portion by the operation of the keyboard 104 and switches 201. That is, the signals memorized in the memory 203 by means of a monitor 212 can be converted to a picture. When it is desired to change a portion of the displayed image, the keyboard switch at the corresponding portion is operated. Then, when the memory state of a storage element of the memory 203 corresponding to this keyboard switch is 1 or 0, it is corrected to 0 or 1, respectively. These corrected states can be confirmed by the monitor 212 immediately. After all desired changes have been made, switches $SW_1$ to $SW_3$ are switched to their opposite side as shown in FIG. 2 and the recorder 211 is operated by means of the recorder controlling circuit 301 to record one frame memorized in the memory 203. At this time, the signal of the former frame is erased.

This correction or modification operation will now be described in detail referring to FIG. 4. In the drawing, the reference numerals 401 and 409 are two switches among the switches 201. Any chattering liable to be generated when the switch 401 or 409 is closed is prevented by means of monostable multivibrators 402 and 410. The electric connection shown in FIG. 4 consists of AND gates 403 and 411 which are circuits for addressing the flip-flop circuits 405, 413 which are the storage elements of the memory 203, OR gates 404 and 412 which are gate circuits for transmitting the trigger pulse to the flip-flop circuits 405 and 413, OR gate 407 and phase inverter 408 which are gate circuits for resetting the next step flip-flop circuit 413 when the previous step flip-flop circuit 405 is triggered, AND gate 418 which is gate circuit for impressing the reproduced signal on the flip-flop circuits 405 and 413, AND gates 406 and 414 which are scanning circuits, and an OR gate 416.

The signals reproduced by the recorder 211 are memorized in the flip-flop circuits 405, 413. First, however, the flip-flop circuits 405, 413 are set to 0. The outputs of the column selector 302 and the row selector 303 are shifted by the clock pulse. Now, the column selector 302 selects the $X_{n-1}$ column and the row selector 303 selects the $Y_m$ row, respectively. At this time, the ouptuts of the column selector 302 and the row selector 303 are supplied to the AND gate circuit 403 of the matrix circuit 304 simultaneously and furthermore supplied to the T-terminal of the flip-flop circuit 405 through the OR gate circuit 404. At this time, when the signal of the color indicated by the color switch 306 is supplied to the AND gate circuit 418, the signal is supplied to the JK-terminal of the flip-flop circuit 405, which memorizes the corresponding signal. If there is no signal, the state of the flip-flop circuit 405 is not changed and the flip-flop circuit 405 memorizes 0 state. When an output signal is obtained from the AND gate circuit 403, the output signal is transmitted to the flip-flop circuit 413 through the OR gate circuit 407 and the inverter 408, and furthermore supplied to the R-terminal. The flip-flop circuit 413 is preset by this signal lest the other devices should misoperate. Now, the flip-flop circuit 405 memorizes a 1; when it is desired to change the state of the flip-flop circuit 405 to 0, the switch 401 among the switches 201 is closed. This produces an output from the monostable multivibrator 402 which is supplied to the T-terminal of the flip-flop circuit 405 through the OR gate circuit 404. When the corresponding color previously selected by the color selector switch 202 is supplied to the JK-terminal as the output of the AND gate circuit 418, the flip-flop circuit 405 reverses the the 0 state.

The states of the flip-flop circuits 405, 413 can be read out by the read column selector 207 and the read row selector 208. That is, when the signal $X'_{n-1}$, indicating the $Y_m$ row, is generated by the selector 208, the AND gate circuit 406 passes the output of the flip-flop circuit 405. Accordingly, when the flip-flop circuit 405 memorizes 1 at first, the signal is transmitted to the monitor 212 through the AND gate circuit 406 and the OR gate circuit 416. After the change, the output 0 is read out by the flip-flop circuit 405.

The modification of the pattern is carried out by selectively closing the switches 401 and 409 according to the selection of the memorizing portion of the color component to be written by the color selector switch 202. For instance, in the case that the flip-flop circuit 413 is in the state of 1 and is desired to be put into the state of 0, the switch 409 is closed. And the monostable multivibrator 410 is triggered and generates pulses for a definite time. This pulse is impressed on the T-terminal of the flip-flop circuit 413 through the OR gate 412 so that the flip-flop circuit 413 may be reversed.

Figure 4:
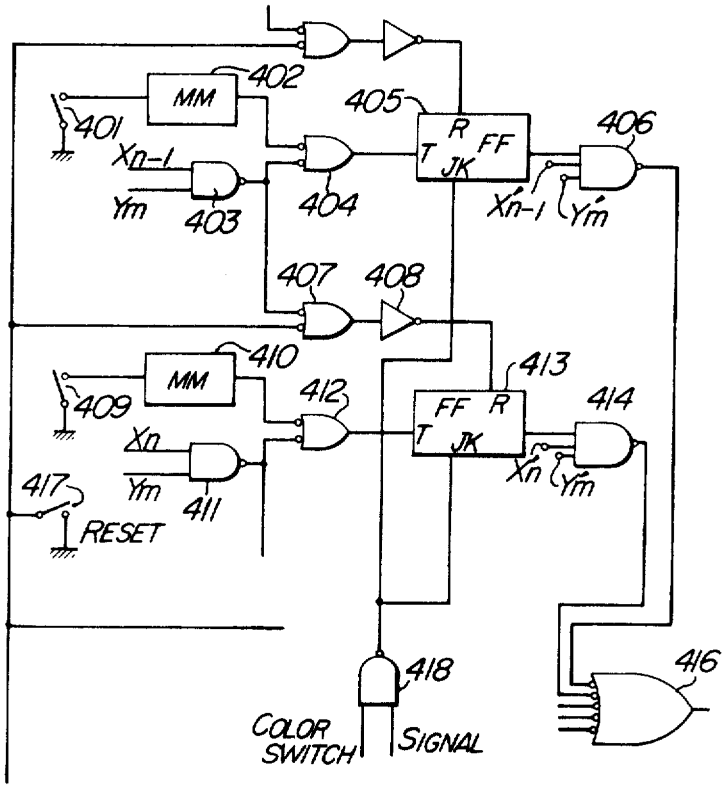
FIG. 4 is a detailed block diagram showing a main part of the construction of the device shown in FIG. 3.

The switch 417 shown in FIG. 4 is a switch for resetting all the storage elements of the memory 203.

Figure 5:
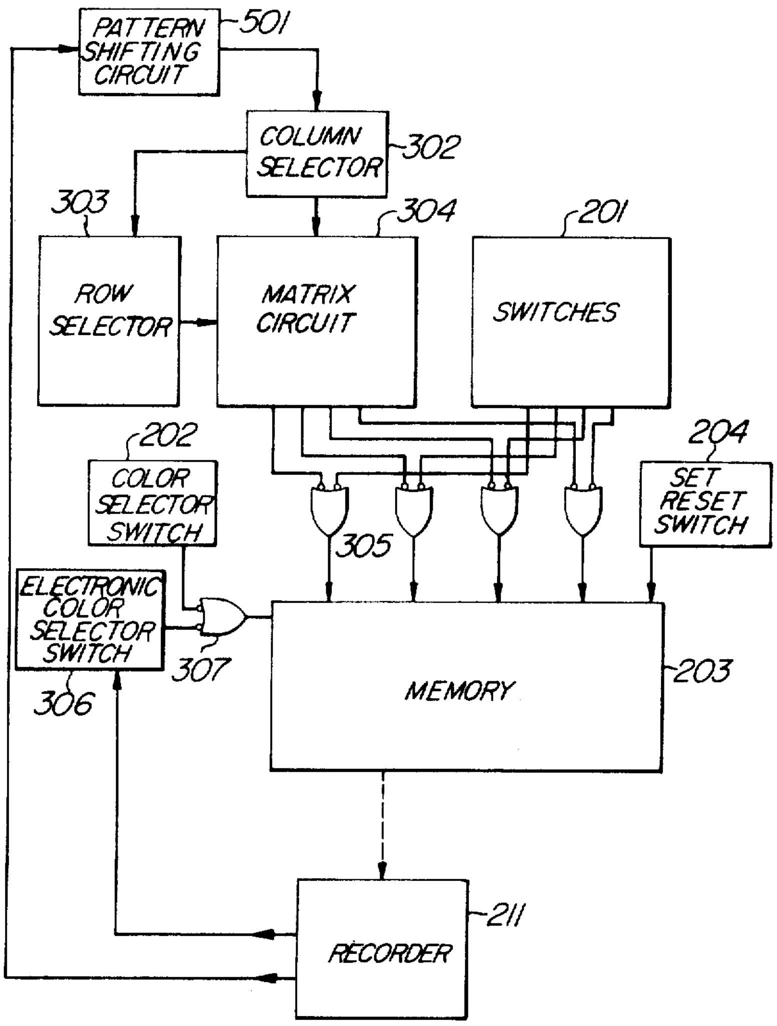
FIG. 5 is a block diagram showing a construction of another embodiment of the device in accordance with the present invention.

Now the method of shifting the pattern will be described in detail referring to FIG. 5. In the drawing, the reference numeral 501 is the circuit for shifting the pattern which has the function of increasing and reducing the number of the clock pulses generated from the recorder 211.

The circuit 501 for shifting the pattern will be explained in FIG. 11 in detail.

Figure 11:
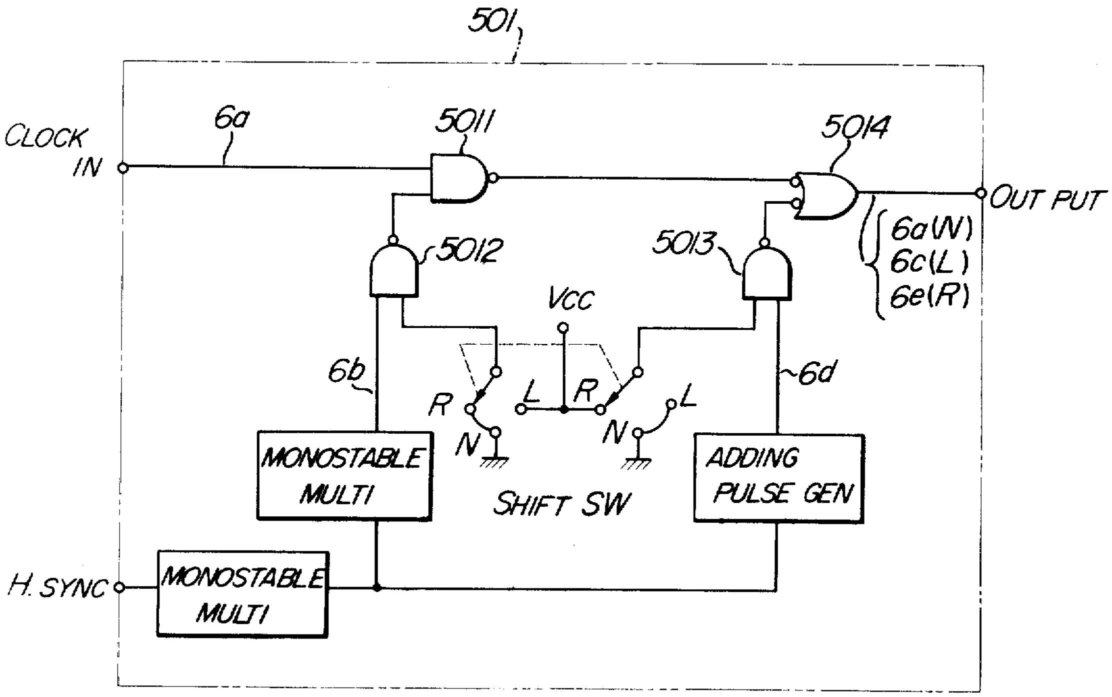
FIG. 11 is a detailed block diagram showing the pattern shift circuit 501 in FIG. 5.

The wave forms of 6*a*(N), 6*c*(L) and 6*e*(R) in FIG. 11 correspond to FIGS. 6*a* to 6*e* respectively. Now, when a shift switch SW is positioned at a normal point, the outputs of NAND gates 5012 and 5013 are H, and the former clock signal appears at the output terminal as it is.

Figure 6A:
FIGS. 6a–f depict the operation of the embodiment of the invention shown in FIG. 5.
Figure 6B:
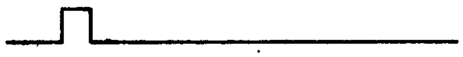

However, when the shift switch is switched "left", gate pulse signals in FIG. 6*b* generated by the horizontal synchronizing signal pass through the NAND gate 5012. At the NAND gate 5011, one of the clock pulses in FIG. 6*a* is deleted, and the pulses in FIG. 6*c* appear at the output. On the contrary, when the shift switch is switched "right", adding pulses FIG. 6*d* generated by the horizontal synchronizing signal pass through the NAND gate 5013. At a NAND gate 5014, furthermore, the adding pulses 6*d* are added to the clock pulses FIG. 6*a* and the pulses in FIG. 6*e* appear at the output.

On the other hand, as the colour signals recorded on the recorder in parallel are added to the memory 203 directly, the position on which the information is written is shifted right or left by increasing or decreasing the clock pulses.

And, since the column selector 302 is operated in accordance with the clock pulse number of which is increased or decreased by the circuit 501, and since signals which consist of clock pulse and color signals are recorded on magnetic tape in parallel, the signal reproduced by the recorder 211 on the memory 203 is memorized in the shifted condition in one direction. Other elements in the drawing are all the same as those shown in FIG. 4 and, accordingly, the description thereof is omitted.

Figure 6C:

FIG. 6*a* shows the clock pulses reproduced by the recorder 211, and FIG. 6*b* shows the gate signal for shifting the pattern leftward. With this gate signal, the pulse indicating the first row of the memory 203 among the clock pulses is taken out and the pulses as shown in FIG. 6*c* is made out. By conducting such an operation by the circuit 501, the color signal as shown in FIG. 6*f* is shifted leftward by one row on the memory. Thus, a blank of one column at the right side end of the memory 203 is produced. In this blank, a writing is conducted by the operation of the switch in the switches 201 corresponding to the blank position, and the resulting pattern is recorded on the magnetic tape with the one row shifted condition. By repeating the above-described operation, a running message shifting leftward can be produced.

Figure 6D:
Figure 6E:
Figure 6F:

On the other hand, in case of shifting the pattern rightward, such pulses as shown in FIG. 6*d* are added to the clock pulse as shown in FIG. 6*a* to make a pulse as shown in FIG. 6*e*. The memorizing on the memory 203 is delayed by the number of the inserted or added pulses to effect the rightward shifting of the color signal.

Figure 7:
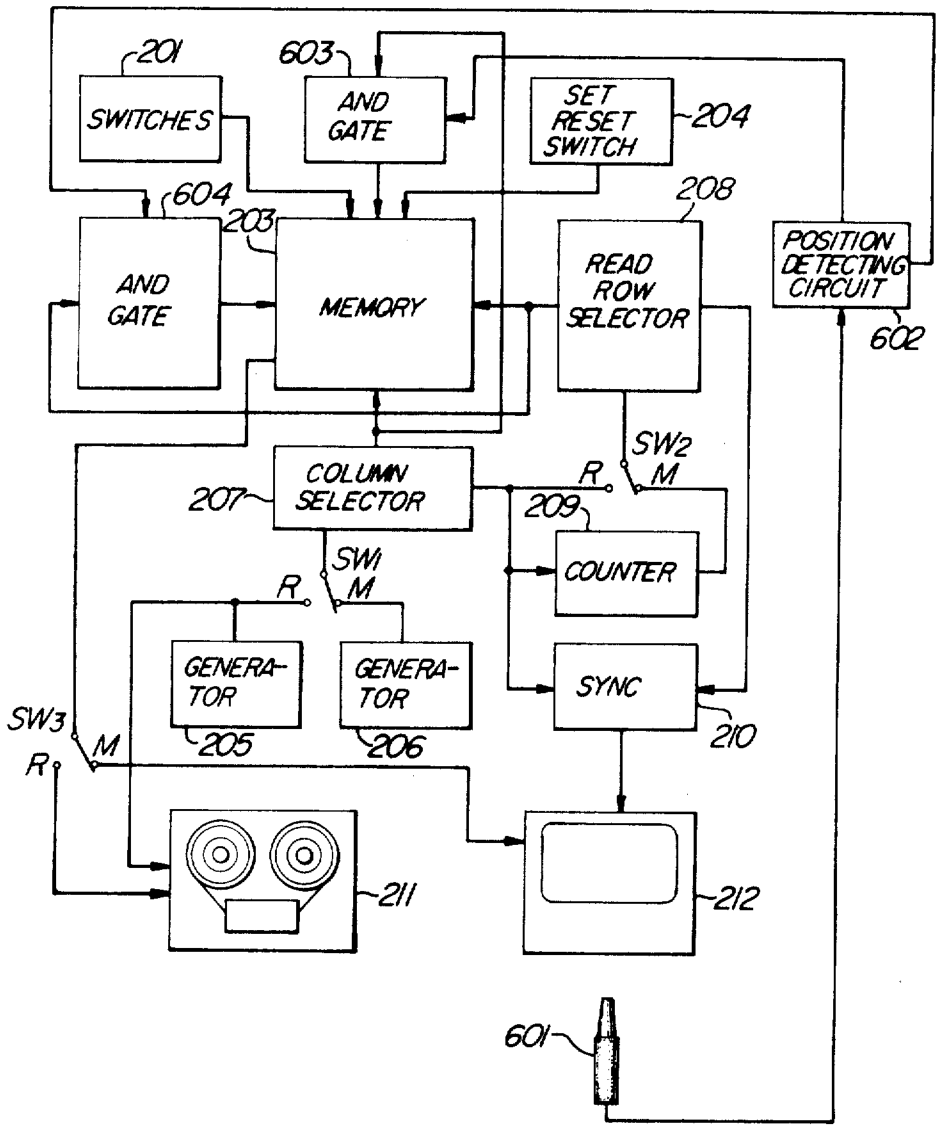
FIG. 7 is a block diagram showing the construction of still another embodiment of the present invention using a light pen.

In FIG. 7, there is shown an electrical construction of an embodiment of the device of the present invention which facilitates the pattern generating operation in the case that it becomes difficult to make the mosaic elements on the monitor 212 correspond to the switches 201 according to increase of the number of the illuminating mosaic elements. In this device, a light pen 601 is used to detect the flying spot on the CRT of the monitor 212. The position of the flying spot indicated by the light pen 601 is detected by a circuit 602.

Figure 12:
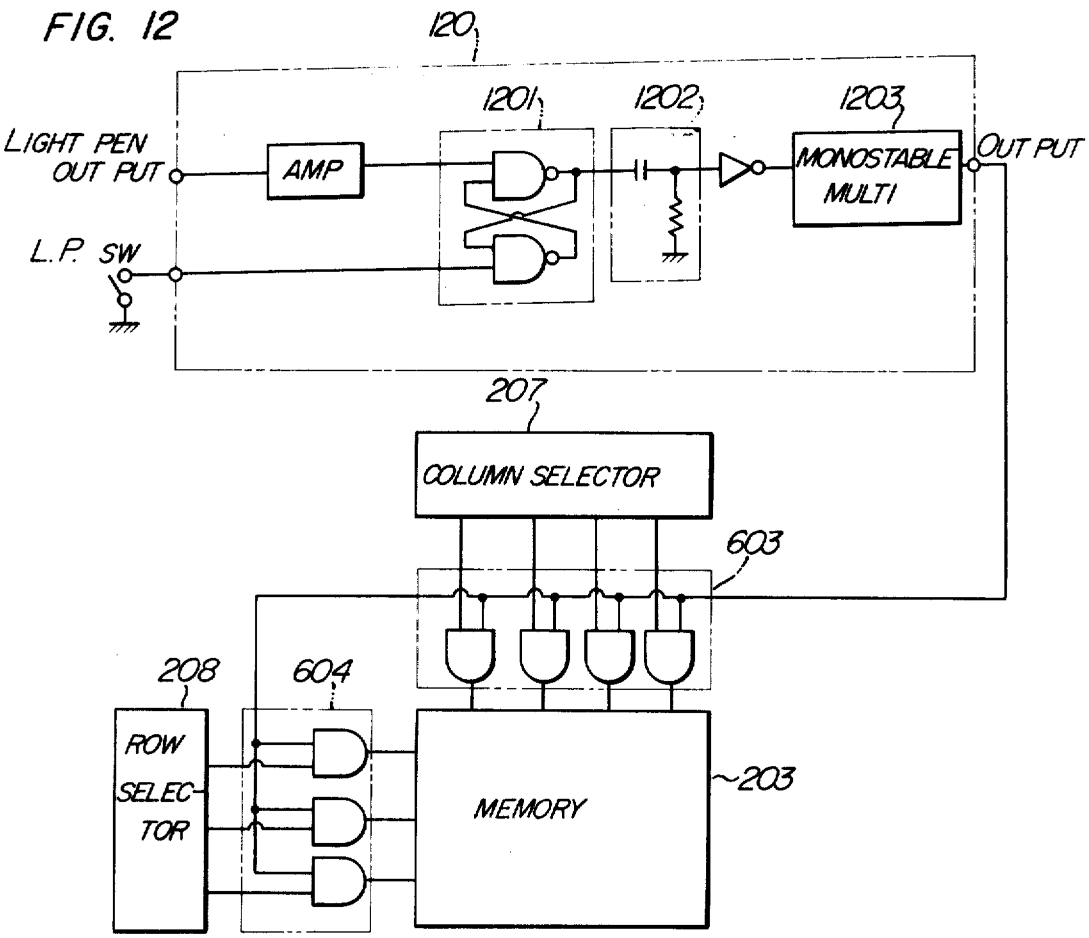
FIG. 12 is a detailed circuit showing the position detecting circuit 602 in FIG. 7.

The position detecting circuit 602 will be explained in FIGS. 12 and 13 in detail hereinbelow.

Figures 13A, 13B, 13C, 13D:
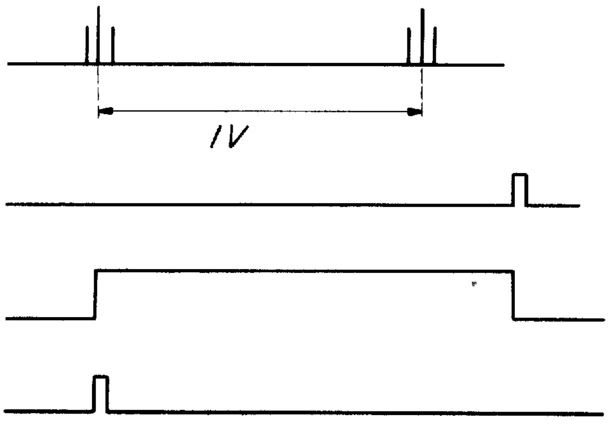
FIGS. 13a–d depict the operation of the embodiment of the position detecting circuit 602 in FIG. 7.

The output wave forms from the light pen 601 are repeatedly generated as shown in FIG. 13*a*. Then, in order to change these output wave forms into a single pulse, a flip-flop circuit 1201 is set. The flip-flop circuit 1201 is reset by pushing a switch included in the light pen 601. FIG. 13*b* shows a reset pulse. FIG. 13*c* shows the output of the flip-flop circuit 1201. The output of the flip-flop circuit 1201 is differentiated by a differential circuit 1202, and the front edge portion of the output pulse is changed to the output signal having a proper pulse width by means of a monostable multibibrator 1203. The AND gate 603 is a circuit for indicating the column number of the memory 203. The AND circuit 604 is a circuit for indicating the row number of the memory 203.

When the flying spot on the CRT of the monitor 212 is detected with the light pen 601, the position detecting circuit 602 decides the position and indicates the address of the row and column on the memory 203. The AND gate 603 indicates the column on the memory corresponding to the flying spot when the output of the position detecting circuit 602 fits with the output of the column selector 207. The output of the row selector 208 is impressed on the AND gate 604 and indicates the row of the memory together with the output of the position detecting circuit 602. The output of the AND gates 603 and 604 make it possible to write on the storage elements.

The indication of the color is conducted by the method set forth hereinbefore.

In the case that it is difficult to sense the position of the flying spot on the CRT of the monitor 212 with the light pen 601 in the above-described embodiment, white dots are generated at the respective positions or a lattice pattern indicating the positions is generated beforehand to overcome the difficulty.

Furthermore, in the present invention a television camera may be used for taking the pattern and for making the memory memorize the A–D converted video signal taken by the television camera. The sampling error is corrected after the signal recorded on the magnetic tape is once transmitted to the memory.

What is claimed is:

1. A pattern generating device comprising: a memory means including a matrix having a plurality of storage elements; switching means including a plurality of switches electrically connected with said storage elements of the memory means for selectively entering information in said storage elements; means for selecting a column of the matrix of said memory means; means for selecting a row of said matrix in correlation with said column selecting means; pulse generating means for triggering both of said selecting means; means for recording and reproducing the information stored in said memory means read by said selecting means and the clock pulse generated by said pulse generating means; controlling means to reproduce and operate one frame of said recording and reproducing means when said one frame is incrementally memorized in said memory means by said recording and reproducing means, and to reverse only said one frame after reproducing for monitoring the information recorded in said one frame; means for monitoring said memorized information; means for introducing said memorized information into one of said recording means and monitoring means; and synchronizing means for correlating the scanning by said two selecting means with the operation of said monitoring means.

2. A pattern generating device comprising a memory means including a matrix having a plurality of storage elements; means for writing a pattern information in said memory means including switching means arranged in a matrix corresponding to said matrix of the storage elements of the memory means; means for selecting a column of the matrix of said memory means; means for selecting a row of said matrix in correlation with said column selecting means; clock pulse generating means for periodically triggering said selecting means; means for recording and reproducing the memorized information in said memory means read by said selecting means and the clock pulse generated by said pulse generating means; control means to reproduce and operate one frame of said recording and reproducing means when said one frame is incrementally memorized in said memory means by said recording and reproducing means, and to reverse only said one frame after reproducing for monitoring the information recorded in said one frame; means for monitoring said memorized information by converting the information into a visual pattern; means for scanning said storage element matrix, said scanning means being triggered by said clock pulse reproduced by said recording and reproducing means when the memorized information recorded in said recording and reproducing means is to be modified; an OR gate inserted between said memory means and said scanning means and writing means; and means for making said memory means sequentially memorize the pattern information reproduced by said recording and reproducing means synchronously with said clock pulse.

3. A pattern generating device as claimed in claim 2 wherein said means for scanning said matrix of the storage elements of the memory means by being triggered by said clock pulse reproduced by said recording and reproducing means has a gate circuit periodically removing said clock pulse causing the writing position of the reproduced pattern information on the memory means to be shifted in one direction whereby new information is sequentially added in the blank portion of the memory means by said writing means.

4. A pattern generating device comprising a memory means including a matrix of a plurality of storage elements; means for selecting a column of the matrix of said memory means; means for selecting a row of the matrix in correlation with said column selecting means; pulse generating means for triggering both of said selecting means; means for recording and reproducing information memorized in said memory means read by said selecting means and the clock pulse generated by said pulse generating means; control means to reproduce and operate one frame of said recording and reproducing means when said one frame is incrementally memorized in said memory means by said recording and reproducing means, and to reverse only said one frame after reproducing for monitoring the information recorded in said one frame; a cathode ray tube display means for displaying said memorized information by converting the information into a visual pattern in synchronism with the reading of said information; means for introducing said memorized information into one of said recording means and cathode ray tube display means; means for synchronizing the scanning by said two selecting means with the scanning of said cathode ray tube display means; optical means for indicating the position of a flying spot on the cathode ray tube of said display means; means for detecting the position indicated by said optical indicating means and indicating the column and row of the storage element corresponding to said indicated position; and AND gate means for writing in said storage elements by generating the logical product of the output of said position detecting means and said selecting means.

5. A pattern generating device as claimed in claim 4, wherein said means for optically detecting the flying spot on the cathode ray tube of said display means is a light pen having a photosensitive element as a light receiving portion.

* * * * *